Aug. 19, 1958 J. C. HARTLEY 2,848,401
METHOD OF ELECTROLYTICALLY RIFLING GUN BARRELS
Filed May 7, 1953 4 Sheets-Sheet 1
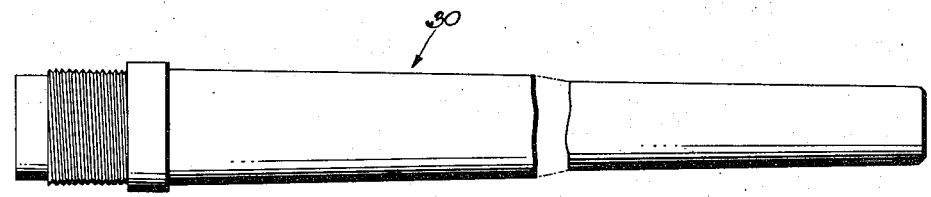
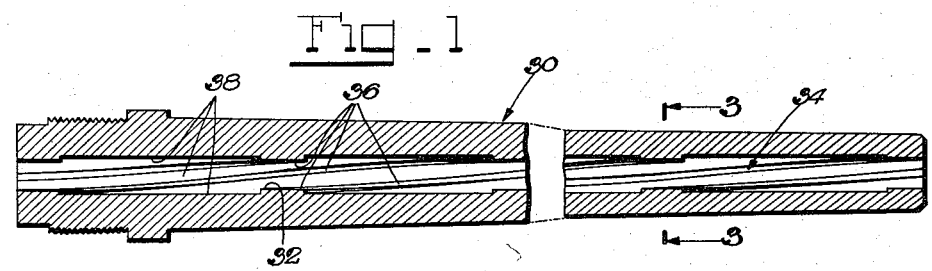
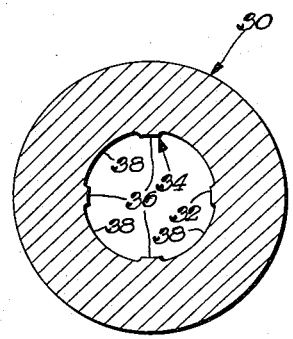
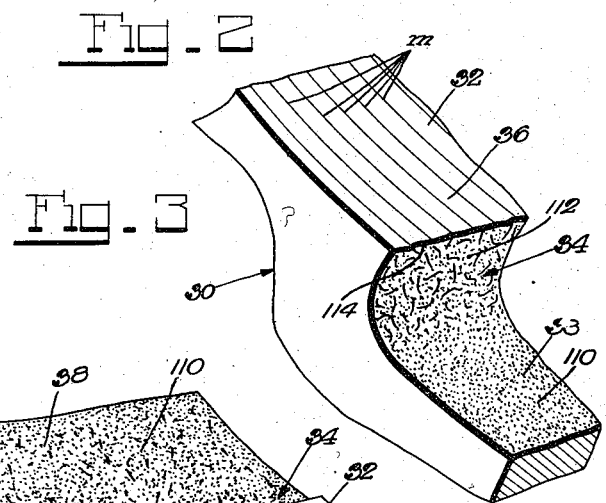
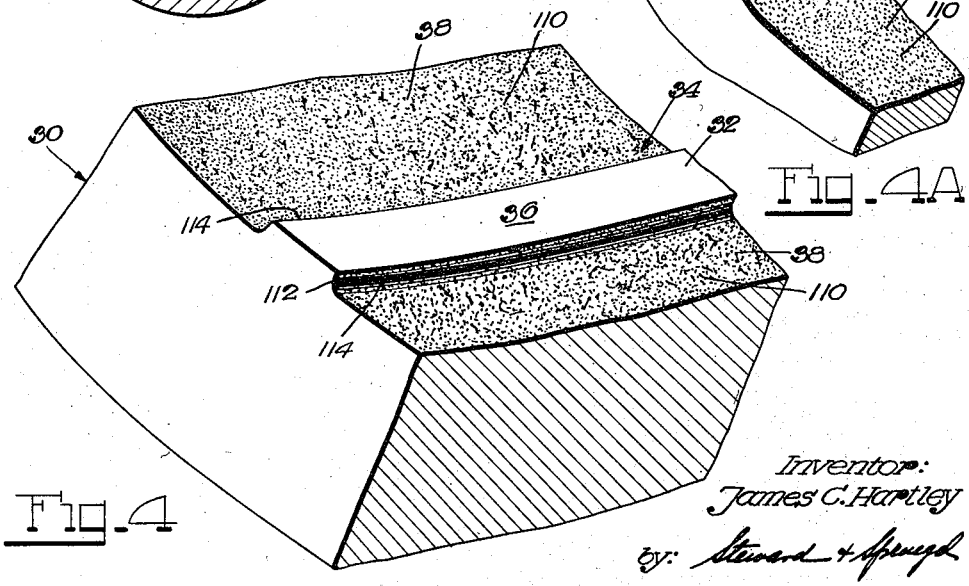
Inventor:
James C. Hartley
by: Steward + Spruegh
Attorneys.

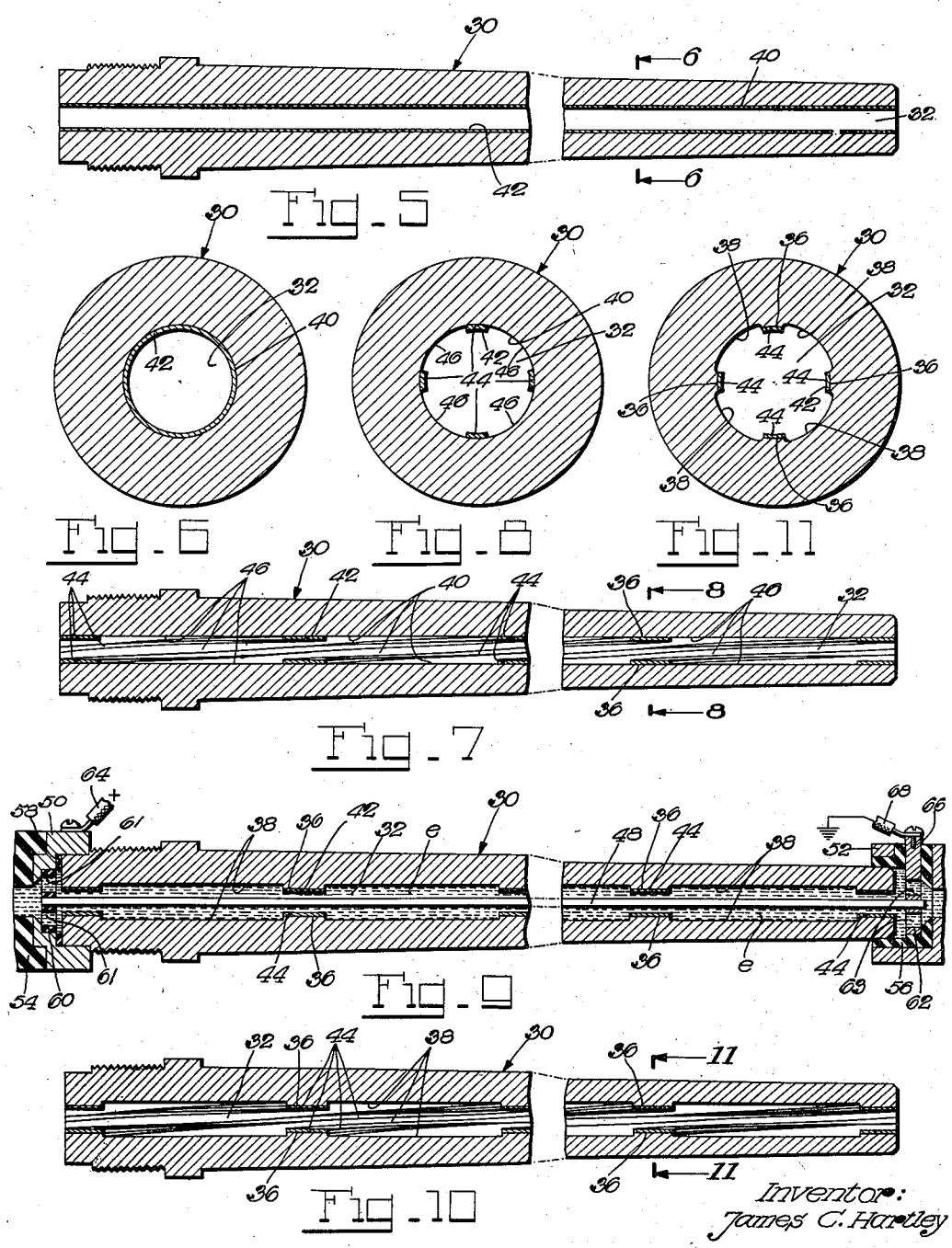

Aug. 19, 1958     J. C. HARTLEY     2,848,401
METHOD OF ELECTROLYTICALLY RIFLING GUN BARRELS
Filed May 7, 1953     4 Sheets-Sheet 3

Inventor:
James C. Hartley
by: Stewart & Spruegel
Attorneys.

Aug. 19, 1958 J. C. HARTLEY 2,848,401
METHOD OF ELECTROLYTICALLY RIFLING GUN BARRELS
Filed May 7, 1953 4 Sheets-Sheet 4
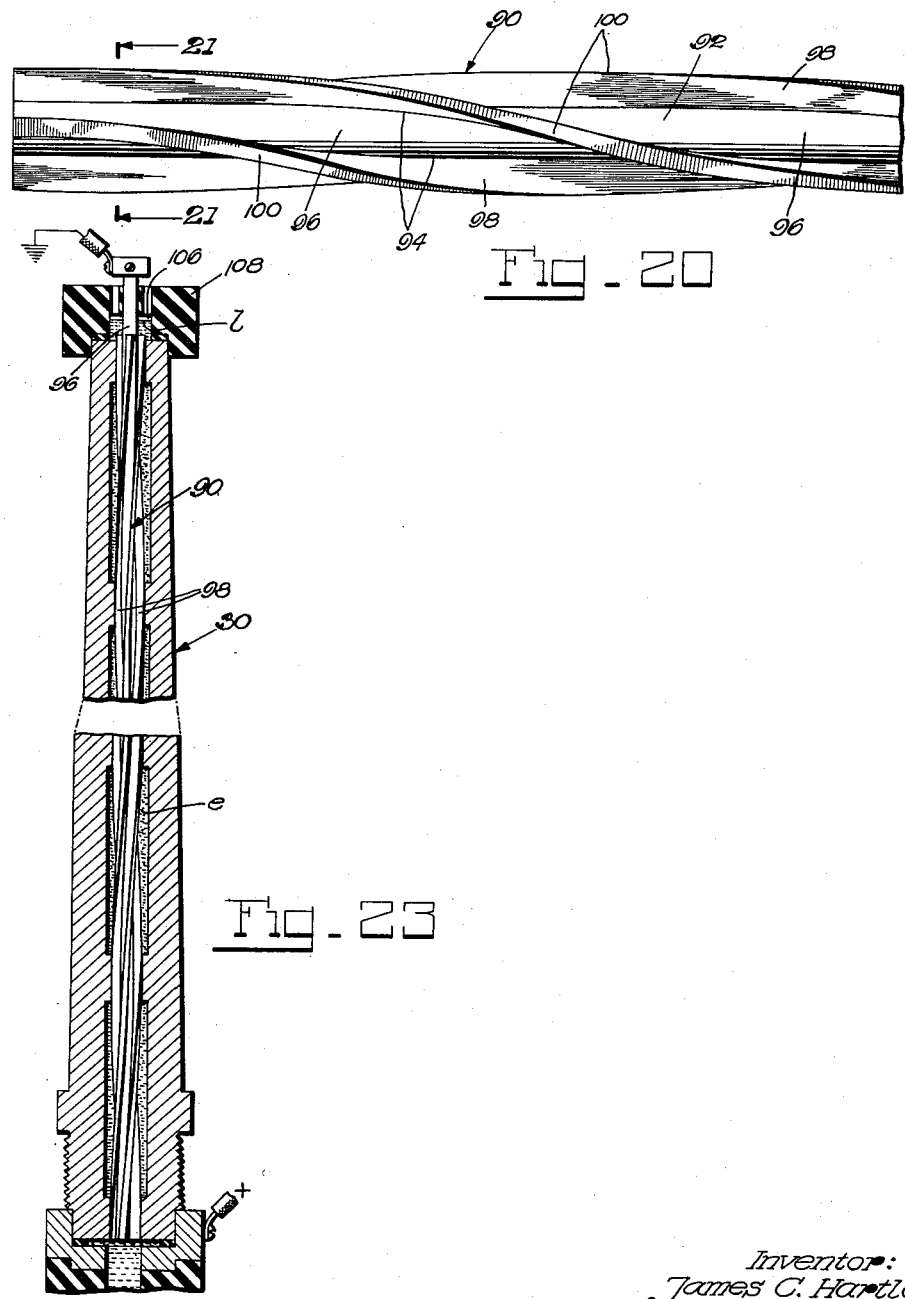

United States Patent Office 2,848,401
Patented Aug. 19, 1958

2,848,401

METHOD OF ELECTROLYTICALLY RIFLING GUN BARRELS

James C. Hartley, Branford, Conn., assignor to Olin Mathieson Chemical Corporation, a corporation of Virginia Application May 7, 1953, Serial No. 353,626

9 Claims. (Cl. 204—143)

This invention relates generally to gun barrels, and more particularly to the rifling in gun barrels and a method of producing it.

Gun barrels are to this day rifled by machining spiral grooves in the walls of their projectile bores. The rifling of gun barrels by machining is in any event a difficult task involving much time, special machinery of accurate performance, and constant attention on the part of a skilled operator. This task is all the more difficult if the bore of the gun barrel to be rifled is tapered or of relatively small diameter, or when a high degree of rifling twist is required, or when the required twist of the rifling is of the gain or loss type. Even when the bore of a gun barrel, and especially a smaller size bore, has been rifled by machining without leaving any apparent defect in the rifling, it is nevertheless necessary, and it is a common procedure, subsequently to drive a lead plug repeatedly through the rifled bore for the removal of burrs therein and for testing the uniformity of the rifling throughout the bore. Also, the formation of the rifling in a gun barrel by machining is the sole, but insurmountable, obstacle to hardening the barrel or at least its bore wall, because the bore wall must be relatively soft in order to be machinable and hardening of the gun barrel or of its bore wall after rifling may distort the rifling. Moreover, spiral grooves machined in the walls of barrel bores, and especially in the walls of the smaller size bores, are sometimes defective in their direction, location or dimensions despite close attention by an operator. These occasional defects in the machined spiral grooves of rifling may be due to any one of several factors, such as a hard spot or spots in the bore wall of a gun barrel, a caught chip or chips in the bore of a gun barrel, even slight wear of an operating part or parts of the rifling machinery, or subjection of the latter to conditions of disturbance such as vibration or shock. Needless to say, gun barrels with even minor defects in their rifling are usually beyond repair and have to be scrapped.

It is an object of the present invention to produce rifling in the wall of the bore of a gun barrel by forming the spiral grooves therein by controlled etching of the bore wall in the places thereof where the spiral grooves are to be located, thereby eliminating all the difficulties encountered in the hitherto general practice of machining these spiral grooves in the bore wall, and also permitting hardening of the barrel, or at least of its bore wall, prior to rifling the same.

It is another object of the present invention to subject those portions of the wall of the bore of a gun barrel in which the spiral groves of the rifling are to be formed to controlled anodic dissolution, thereby to produce in the bore wall, with maximum efficiency and within a minimum time period, spiral grooves which are without burrs and are most uniform in depth even if the hardness of the material of the bore wall should vary throughout the longitudinal extent of the latter.

Another object of the present invention is to devise a method which lends itself to efficient mass production at low cost of accurate electrolytically formed rifling in the bores of gun barrels regardless of whether the bores are tapered or non-tapered, and regardless of the degree and type of twist required of the rifling.

It is a further object of the present invention to use as a preferred electrolyte in the aforementioned method of electrolytically forming rifling in the bores of gun barrels an electrolytic polishing solution, thereby to obtain spiral grooves which have a characteristic surface texture and appearance of low-polished surfaces and, hence, have a lower coefficient of friction than the surfaces of the hitherto machined spiral grooves of rifling.

Another object of the present invention is to apply temporary insulating masks over those portions of the bore wall in a gun barrel which are to form the spiral lands of the rifling, and subject the remaining portions of the bore wall simultaneously to controlled anodic dissolution for most efficient and expeditious formation of the spiral grooves of the rifling in the bore.

A further object of the present invention is to extend a cathode throughout the bore to be rifled of a gun barrel in substantially uniform spaced relation with the non-masked portions of the bore wall in which the spiral grooves of the rifling are to be formed, so that the electrolyte in the bore will act uniformly throughout the length of the bore for the uniform formation of the spiral grooves of the rifling in the bore wall.

It is another object of the present invention to mask the lands-forming wall portions of the bore of a gun barrel in an exceedingly simple and quick manner by means of a core or mandrel which is readily insertable in and removable from the bore of the gun barrel and which may be used over and over again in rifling the bores of further gun barrels.

A further object of the present invention is to provide a masking core as aforementioned which, on ready insertion into the bore of a gun barrel, may be expanded into snug and uniform engagement with the lands-forming portions of the bore wall for optimum masking of the same.

Another object of the present invention is to provide the aforementioned masking core with outwardly radiating and spirally extending ribs of insulating material of which the outer surfaces are in masking relation with the adjacent lands-forming portions of the bore wall of a gun barrel in which the core is inserted, and which have sufficient space between them to define in the bore compartments of substantially equal volumes for holding substantial amounts of electrolyte for the electrolytic formation of the spiral grooves of the rifling.

It is a further object of the present invention to provide the cathode in the form of separate conductors which are carried by the aforementioned masking core in the spaces between successive ribs thereof at their divergence from each other, so that the bore wall of a gun barrel in which the masking core is inserted is spaced substantially equally and at maximum distance from the adjacent conductors, and current flows from the anodic gun barrel to these conductors through the entire intervening electrolyte in the bore for most efficient and expeditious electrolytic formation of the spiral grooves of the rifling in the bore wall.

Another object of the present invention is to provide, as an alternative to the aforementioned masking core and separate cathodic conductors thereon, a combined masking core and cathode of exceedingly simple, yet accurate construction, by providing a single conductor rod having spirally-extending spaced peripheral grooves in which are mounted the inner ends of separate outwardly radiating masking ribs that are preferably plastic or other insulating strips having sufficient flexibility for their ready deformation from flat strip form into spiral strip form.

It is another object of the present invention to make provisions for controlling the temperature of the electrolyte for optimum performance of the same in the course of the electrolytic grooving of the non-masked portions of the bore wall.

It is a further object of the present invention to provide for continuous segregation from the electrolyte in the barrel bore of the hydrogen which is continuously liberated in the course of the electrolysis, and which would interfere with the electrolytic grooving of the bore wall if it were not thus segregated.

Another object of the present invention is to provide, as an alternative to separate provisions for controlling the temperature of the electrolyte and for segregating the hydrogen from the electrolyte in the barrel bore, common provisions for controlling the temperature of the electrolyte and for segregating the hydrogen, by circulating the electrolyte through the barrel bore to permit heating or cooling of the electrolyte, whichever is required, between passages of the electrolyte through the barrel bore, and cause the circulating electrolyte to carry the hydrogen from the barrel bore during passages therethrough.

It is a further object of the present invention to provide for convenient and highly practical electrolytic rifling of the bores of gun barrels of alloys which are difficult to machine, such as stainless steel, or Stellite, molybdenum, tungsten, carbide or highly alloyed steel, for instance.

Further objects and advantages will appear to those skilled in the art from the following, considered in conjunction with the accompanying drawings.

In the accompanying drawings, in which certain modes of carrying out the present invention are shown for illustrative purposes:

Fig. 1 is a side view of a gun barrel embodying the present invention;

Fig. 2 is a longitudinal section through the same gun barrel, showing the electrolytically produced rifling of the present invention;

Fig. 3 is an enlarged cross section through the gun barrel, taken on the line 3—3 of Fig. 2;

Fig. 4 is an enlarged perspective of a piece of the gun barrel, showing the different surface textures of a land and grooves of the electrolytically produced rifling in the barrel bore;

Fig. 4A is a greatly enlarged perspective of a piece of the gun barrel showing even more clearly the different surface textures of a land and groove of the electrolytically produced rifling in the barrel bore;

Fig. 5 is a longitudinal section through a gun barrel subjected to an initial step in a method of electrolytically rifling the bore thereof in accordance with the present invention;

Fig. 6 is an enlarged cross section taken on the line 6—6 of Fig. 5;

Fig. 7 is a longitudinal section through the gun barrel of Fig. 5 after the same has been subjected to another step in the method of electrolytically rifling the bore thereof in accordance with the present invention;

Fig. 8 is an enlarged cross section taken on the line 8—8 of Fig. 7;

Fig. 9 is a longitudinal section through the gun barrel of Figs. 5 and 7, and showing it subjected to still another step in the method of electrolytically rifling the bore thereof in accordance with the present invention;

Fig. 10 is another longitudinal section through the same gun barrel after subjection to the method step shown in Fig. 9;

Fig. 11 is an enlarged cross section taken on the line 11—11 of Fig. 10;

Figure 14:
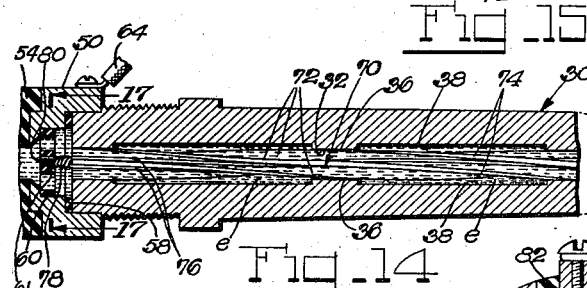
Fig. 14 is a longitudinal section through a gun barrel while subjected to the preferred method of rifling its bore electrolytically in accordance with the present invention.
Figure 17:
Figure 18:
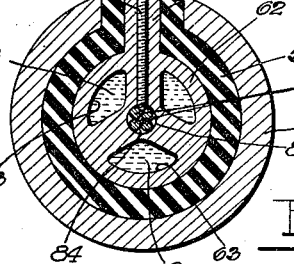
Figure 21:
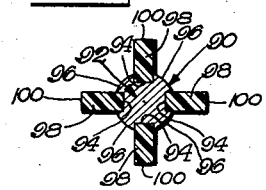
Figures 19, 22:
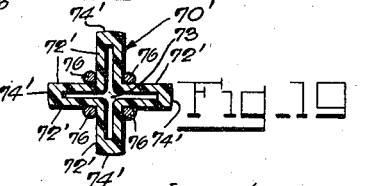

Figs. 17 and 18 are enlarged sections taken on the lines 17—17 and 18—18, respectively, of Fig. 14;

Fig. 19 is a cross section through a modified masking core which may be used to advantage in electrolytically rifling the bore of a gun barrel in accordance with the preferred method;

Fig. 20 is a fragmentary side view of another modified masking core and cathode which may be used in electrolytically rifling the bore of a gun barrel in accordance with the preferred method;

Fig. 21 is a cross section taken on the line 21—21 of Fig. 20;

Fig. 22 is a cross section through a further modified masking core and cathode which may be used in electrolytically rifling the bore of a gun barrel in accordance with the preferred method; and Fig. 23 is a longitudinal section through a gun barrel subjected to a further modified method of electrolytically rifling its bore in accordance with the present invention.

Referring to the drawings, and more particularly to Figs. 1 to 3 thereof, the reference numeral 30 designates a gun barrel having in its projectile-discharge bore 32, rifling 34, the lands 36 and grooves 38 of which extend in the usual spiral fashion longitudinally of the gun barrel. For the sake of simplicity, the bore of the gun barrel is shown to be of the non-tapered kind, and the twist of the rifling is shown to be uniform throughout. For the sake of clarity, the spiral grooves 38 of the rifling are shown of exaggerated depth. The rifling 34 in the bore 32 of the gun barrel is, in accordance with the present invention, formed electrolytically, leaving the lands 36 and grooves 38 of the rifling with different characteristic surface textures to be described hereinafter (Figs. 4 and 4A).

Reference is now had to Figs. 5 to 11, inclusive, which show the gun barrel 30 in various stages during and after subjection to certain steps in one of several methods of electrolytically rifling its bore in accordance with the present invention. Thus, the wall 40 of the bore 32 of the gun barrel is covered with a coating 42 of any suitable non-corrosive or corrosion-resistant material. The term "corrosion" as used herein is meant to describe the effect of anodic dissolution on the wall of a gun barrel, and the terms "non-corrosive" or "corrosion-resistant" as used herein denote immunity, or substantial immunity, to anodic dissolution. The coating of the bore wall may be accomplished by introducing a corrosion-resistant medium, such as a vinyl resin finish, for instance, in the barrel bore 32 and drawing off all of the medium except the fairly uniform film or coating 42 which adheres to the bore wall 40. The film or coating 42 may then be baked, if necessary. Thereafter, those portions of the coating 42 are removed which cover the bore wall at the places in which the spiral grooves 38 of the rifling are to be formed, leaving the remaining wall portions which are to form the lands 36 of the rifling covered with masks 44 of the coating (Figs. 7 and 8). The coating 42 may be removed from the bore wall at the described places in any suitable manner, as by a scraper, for instance, so as to leave non-masked the portions 46 of the bore wall in which the grooves 38 of the rifling are to be formed.

A cathode in the form of an electric conductor 48 is next placed in the bore of the gun barrel and the latter is placed in circuit communication with a suitable aqueous electrolyte e (Fig. 9). To this end, the opposite ends of the gun barrel 30 may be received in suitable terminals 50 and 52, respectively, of an electrolyte circulating system, of which terminal 50 may be electrically conductive and mounted in an insulating support 54, and terminal 52 may be provided with an insulating liner 56 in which the adjacent end of the gun barrel is received in sealed fashion. The other end of the gun barrel is, in this instance, in electrical contact with the terminal 50 and may bear against a sealing ring 58 in the terminal. The electrolyte e may be pumped from any suitable supply source (not shown) through a conduit, including the support 54 and terminal 50, into the bore 32 of the gun barrel, and then returned to the supply source via another conduit, including the insulation-lined terminal 52. Accordingly, electrolyte e is, in the present instance, constantly circulated through the bore of the gun barrel while the same is being electrolytically rifled. The opposite ends of the cathode 48 are received in electrically insulated and electrically conductive ring supports 60 and 62 in the terminal 50 and insulating liner 56 in the terminal 52, respectively, so that the cathode is evenly spaced from the wall of the bore in the gun barrel. The supports 60 and 62 are apertured at 61 and 63, respectively, for the passage therethrough of the circulating electrolyte e. The terminal 50 is connected through a conductor 64 with the positive side of any suitable electric power source, thus making the gun barrel the anode, while the ring support 62 has an outwardly projecting terminal 66 receiving a conductor 68 for the connection of the cathode 48 with the negative side of the electric power source.

With the electrolyte e flowing through the bore of the anodic gun barrel 30 and an electric current of suitable density passing through the electrolyte for a suitable length of time (Fig. 9), the non-masked portions 46 of the bore wall of the gun barrel (Figs. 7 and 8) are subjected to anodic dissolution until the spiral grooves 38 of proper depths are formed in these non-masked wall portions (see also Fig. 11). The electrolytic process is then stopped, whereupon the rifled gun barrel is removed from the terminals 50 and 52 and also from the cathode 48. As a final step in the instant method of electrolytically rifling the bore of the gun barrel, the masks 44 (Fig. 10) are removed, mechanically or chemically in any suitable manner, from the barrel bore to expose the lands 36 of the rifling (Figs. 2 and 3).

The circulation through the bore of the gun barrel of the electrolyte e during the electrolytic process is advantageous in several respects. Thus, the temperature of the circulating electrolyte may, between passages through the bore of the gun barrel, be conveniently regulated in any suitable manner for optimum performance of the electrolyte. Further, the circulating electrolyte will carry from the bore of the gun barrel the hydrogen which is continuously liberated as a result of cathodic reaction and which, if not removed from the bore of the gun barrel, will interfere with, if not stop, the anodic dissolution of the non-masked wall portions 46 of the bore of the gun barrel. To accomplish most rapid and complete removal of the constantly liberated hydrogen from the bore of the gun barrel, the latter is preferably disposed substantially vertically during its subjection to the electrolytic rifling process.

Figure 12:
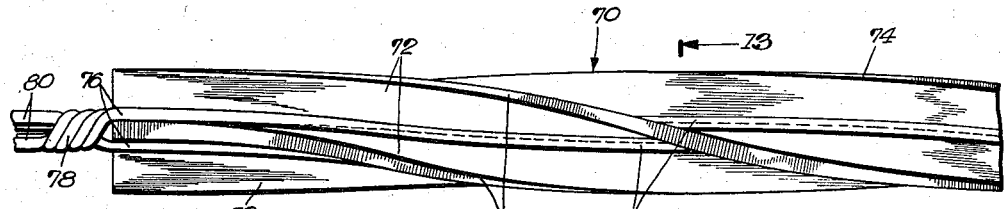
Fig. 12 is an enlarged fragmentary side view of a masking core and cathode used in electrolytically rifling the bore of a gun barrel according to a method which is greatly preferred over the electrolytic rifling method disclosed in Figs. 5 to 11.
Figure 13:
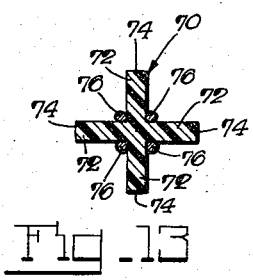
Fig. 13 is a cross section through the masking core and cathode as taken on the line 13—13 of Fig. 12.
Figures 15, 16:
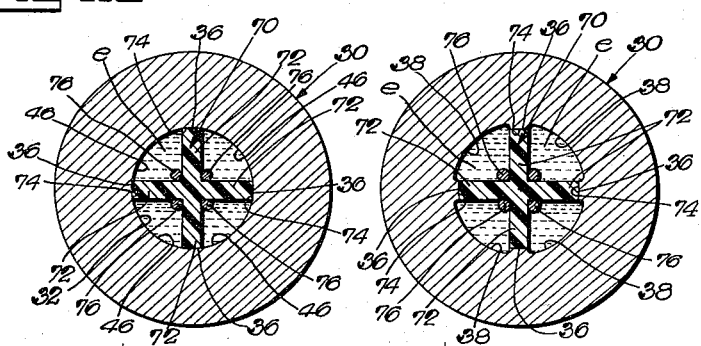
Fig. 15 is an enlarged cross section through the gun barrel at the beginning of the electrolytic formation of the rifling grooves in the bore thereof in accordance with the preferred electrolytic rifling method.
Fig. 16 is an enlarged cross section through the gun barrel as taken on the line 16—16 of Fig. 14, and showing the electrolytically formed rifling grooves in the bore wall of the gun barrel substantially finished.

While in the preceding electrolytic rifling method the lands-forming wall portions of the bore of the gun barrel were for their masking covered with a suitable corrosion-resistant coating, there is employed in the electrolytic rifling method of Fig. 14 a much preferred masking core 70 for temporarily covering the lands-forming wall portions of the bore of the gun barrel (see also Figs. 12, 13 and 15). The masking core 70 is made of any suitable electric insulating and corrosion-resistant material, such as plastic, for instance, and has as many outwardly radiating and spirally extending ribs 72 as there are lands of the desired rifling. In the present instance, the masking core 70 is provided with four equiangularly spaced ribs 72 for forming rifling with four lands. The ribs 72 diverge from each other in the manner best shown in Fig. 13, and may be of uniform thickness throughout. The outer surfaces 74 of the ribs 72 are formed and dimensioned to effectively mask the lands-forming wall portions 36 of the bore of the gun barrel when the masking core 70 is inserted therein (Fig. 15).

The cathode used in electrolytically rifling the bore of the gun barrel with the aid of the masking core 70 is, in the present instance, in the form of separate conductor wires 76 which extend in the spaces between successive ribs 72 of the masking core 70 along their divergencies from each other (Figs. 12, 13 and 15), and are intertwisted at 78 beyond the opposite ends of the masking core for their convenient attachment to the latter.

The instant and greatly preferred method of electrolytically rifling the bore of the gun barrel 30 (Fig. 14) is identical with the previously described method (Figs. 7, 9 and 10), except that the lands-forming wall portions of the bore of the gun barrel are masked by the core 70. The free ends 80 of the cathode-forming conductor wires 76 are removably received in the non-conductive and conductive ring supports 60 and 62, respectively (see also Figs. 17 and 18). The conductive ring support 62 is provided with a terminal screw 82 which in this instance releasably clamps the adjacent ends 80 of the cathode wires 76 in the central aperture 84 in the ring support 62.

With the electrolyte e flowing through the bore of the anodic gun barrel 30 and an electric current of suitable density passing through the electrolyte for a suitable length of time (Fig. 14), the non-masked portions 46 of the bore wall of the gun barrel (Fig. 15) are subjected to anodic dissolution until the spiral grooves 38 of proper depths are formed in these non-masked wall portions (Figs. 14 and 16).

Fig. 19 shows, in cross section, a modified masking core 70' which may in all respects be like the previously described masking core 70, except that the present masking core is slightly resiliently expansible laterally so that the outer surfaces 74' of the ribs 72' thereof may firmly engage the bore wall of a gun barrel. To this end, the expansible masking core 70 may be made of slightly resilient plastic and formed with an internal passage 73 for expansion of the core by means of a suitable fluid which may be introduced in the passage 73 and held in any suitable manner under sufficient compression to accomplish the desired expansion of the core into firm masking engagement with the lands-forming portions of the bore wall during the electrolytic rifling process. The masking core 70' may conveniently be obtained by extrusion.

Figs. 20 and 21 show a combined masking core and cathode 90 which may be used in lieu of the masking core 70 with its separate cathode wires 76. The combined masking core and cathode 90 comprises a central electric conductor 92 having in its periphery spirally extending grooves 94 which leave intermediate non-grooved portions 96 of considerable peripheral extent. Suitably secured in the peripheral grooves 94 in the conductor 92, as with cement, for instance, are ribs or strips 98 of preferably flexible insulating material, such as plastic, for example, the outer surfaces 100 of which are formed and dimensioned like the desired lands of rifling. This combined masking core and cathode 90 is exceedingly simple in construction and may readily be produced at low cost, it being merely required to machine the peripheral grooves 94 in the conductor 92 and thereafter insert and mount the originally flat strips 98 in the peripheral grooves 94 in which they will readily assume and retain the desired spiral disposition.

Fig. 22 is a cross section through a modified combination masking core and cathode 102 which distinguishes from the combined masking core and cathode 90 of Figs. 20 and 21 by having a central electric conductor 92' which is tubular in cross section for the passage therethrough of a temperature modifying medium.

While circulation of the electrolyte e through the bore of the gun barrel is advantageous for the control of the proper temperature of the electrolyte between passages of the same through the bore of the gun barrel and for the removal from the barrel bore of the hydrogen which is constantly liberated during the electrolysis, as described, it is to be understood that the hereinbefore described methods of electrolytically rifling the bore of a gun barrel do not rely for their success on circulation of the electrolyte through the bore of the gun barrel. Thus, the electrolyte e may be forced into the substantially vertically disposed gun barrel 30 from the bottom thereof (Fig. 23) until the level 1 of the electrolyte is above the open top of the gun barrel and within the opening 106 in the top barrel support 108 which is made of insulating material due to the use of the combined masking core and cathode 90 in the exemplary showing, whereupon the electrolyte thus introduced into the bore of the gun barrel may be held therein during the entire electrolytic rifling process. The hydrogen liberated in the course of the electrolysis will then segregate of its own accord from the electrolyte through the opening 106 in the top barrel support 108. If the electrolysis should take place at a relatively rapid rate at which the liberated hydrogen would be too slow to segregate to the open top support 108 and would more or less interfere with the electrolytic formation of the spiral grooves of the rifling, the segregation of the hydrogen from the electrolyte may be expedited in a number of different ways, such as by agitating the electrolyte in the bore of the gun barrel in any suitable manner, or subjecting the gun barrel to vibration, for instance. Accelerated segregation of the hydrogen from the electrolyte in the bore of the gun barrel may also be accomplished by pulsating the electrolyte back and forth in the bore of the gun barrel in any of the arrangements of Figs. 9, 14 or 23, in which case the previously mentioned electrolyte-circulating pump would, in the case of the arrangements of Figs. 9 and 14, be replaced with a pulsator (neither shown).

The aqueous electrolyte used in electrolytically rifling the bore of a gun barrel may be any one of different kinds which may have their optimum performance at various temperatures, either above or below room temperature. It is preferred, however, to use as electrolyte any one of several known electrolytic polishing solutions of which the ones actually tried performed most satisfactorily when pre-heated above room temperature. Given by way of example only, one of the electrolytic polishing solutions which proved satisfactory for the purpose in mind was composed of 50% by volume of sulphuric acid and 50% by volume of phosphoric acid, each of commercial concentration.

Following is an account of an electrolytic rifling process to which the bore of a gun barrel was subjected. It is to be understood, however, that this account is given only as an example and is in nowise meant to introduce any limitation or limitations, since several factors involved in the process may obviously be varied without departing from the spirt of this invention. The bore of the gun barrel was finish-reamed and had a diameter of .301". The gun barrel, after insertion therein of a masking core and cathode of the kind shown in Figs. 12 and 13, was placed upright in circuit-communication with the above-specified electrolytic polishing solution in an arrangement similar to that indicated in Fig. 14, with the barrel 30 disposed substantially vertically. The electrolyte, which was pre-heated to approximately 49° C., was continuously circulated through the barrel bore, without any special provisions for cooling the electrolyte between passages through the barrel bore, while a current of 4 amperes was passed through the electrolyte in the barrel bore, for approximately 1½ hours. The electrolytic process was then stopped, at which time the temperature of the electrolyte in the bore of the gun barrel had risen to approximately 59° C. which did not adversely affect the plastic material of which the masking core was composed, namely polystyrene. The rifling grooves obtained in the bore wall of the gun barrel as a result of this electrolytic process were of a uniform depth of .0045" and generally satisfactory in all other respects.

Rifling produced in the bore walls of gun barrels in accordance with the present invention showed unique surface textures. Thus, the lands 36 of the rifling showed the fine marks left in the original bore as a result of its machining. In this case, the marks m (Fig. 4A) were formed by the finish-reaming of the bore of the gun barrel. The bottoms 110 of the grooves 38 of the rifling had a finished appearance and showed a polish of some luster, although the corroded characteristics of these groove bottoms were discernible on closer inspection with a magnifying glass (Figs. 4 and 4A). The side walls 112 of the rifling grooves had an appearance distinctly different from those of the lands 36 and groove bottoms 110 (Fig. 4A) and showed somewhat more pronounced corroded characteristics than the groove bottoms 110. These corroded characteristics of the side walls 112 of the rifling grooves were also discernible with a magnifying glass at the opposite side edges 114 of the lands 36 which, magnified, appeared to be slightly or minutely jagged as indicated in Fig. 4A. Further, the side walls 112 of the rifling grooves were distinctly curved in cross section as best indicated in Fig. 4A.

The term "corroded characteristics" is used herein, not in any derogatory sense, but in order to distinguish the surface texture and appearance of the electrolytically formed rifling grooves 38 from the different surface texture and appearance of the machined lands 36. Actually, the surface texture of the "corroded" bottoms 110 of the rifling grooves is finer and smoother than the surface texture of a machined surface other than a ground surface, and shows a somewhat dull luster that definitely suggests a polished surface which is believed to be due to the use of the preferred electrolytic polishing solution in the process of rifling the bore of the gun barrel. Insofar as the polished appearance of the bottoms 110 of the rifling grooves 38 is concerned, the term "low-polish" is used herein and in the appended claims to signify that the polished appearance of these groove bottoms 110 is considerably duller than that of a highly polished mirror-like surface. The corroded surface texture of the side walls 112 of the rifling grooves 38, while somewhat more pronounced than that of the groove bottoms 110 and lacking any polished appearance, is nevertheless so fine as to be non-objectionable. Likewise, the jagged condition of the side edges 114 of the lands 36 of the rifling, being discernible only on inspection with a magnifying glass, is so slight as to be non-objectionable. Actual firing tests showed that the slightly jagged side edges 114 of the lands of the rifling did not impede the travel of a projectile through the rifled bore of the gun barrel. The electrolytically formed grooves 38 of the rifling are, in location and dimensions, at least as accurate as, if not more accurate than, machined rifling grooves, and their overall surfaces are at least as smooth, if not smoother, than those of machined rifling grooves. Moreover, the electrolytic formation of the rifling grooves in accordance with this invention eliminates the manifold and serious difficulties encountered in machining rifling grooves in bores which may be non-tapered or tapered, or in the formation of rifling the twist of which may be uniform or of the gain or loss type. Further, the electrolytic formation of the rifling grooves in accordance with this invention permits for the first time highly desirable hardening of a gun barrel, or of a liner thereof, prior to its rifling. The instant electrolytic rifling method is also admirably suited for rifling gun barrels or barrel liners of certain alloys, such as stainless steel, or Stellite, molybdenum, tungsten or carbide steel, for instance, which are hard to machine.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A method of rifling the bore of a gun barrel, which comprises coating the entire wall of the bore with a corrosion-resistant film; removing from the bore wall the portions of said film covering those wall portions only which are adapted to receive the spiral grooves of the rifling; introducing in the bore electrolyte operative for anodic dissolution of the uncovered wall portions of the bore of the anode-forming gun barrel; passing through said electrolyte an electric current of a magnitude and for a time period sufficient to produce rifling grooves of proper depths in the uncovered wall portions of the bore; and then removing the remaining film from the bore wall to expose the lands of the rifling.

2. A method of rifling the bore of a gun barrel, which comprises inserting in the bore an insulating core having outward projections in masking relation with those portions of the bore wall which are adapted to form the lands of the rifling and leaving exposed the remaining portions of the bore wall; providing a cathode member held in spaced relation to the wall of said bore by said insulating core; introducing in the bore electrolyte operative for anodic dissolution of the exposed wall portions of the bore of the anode-forming gun barrel; passing from said barrel to said cathode member through said electrolyte an electric current of a magnitude and for a time period sufficient to produce rifling grooves of proper depths in the exposed wall portions of the bore; and then removing the core and cathode member from the bore to expose the lands of the rifling.

3. A method of rifling the bore of a gun barrel, which comprises inserting in the bore a slightly resilient hollow insulating core having outward projections for engaging and masking those portions of the bore wall which are adapted to form the lands of the rifling and leaving exposed the remaining portions of the bore wall; introducing in the hollow core a fluid under pressure for slight lateral expansion of the core to bring the outward projections thereof into firm masking engagement with the bore wall; providing a cathode member held in spaced relation to the wall of said bore by said insulating core; introducing in the bore electrolyte operative for anodic dissolution of the exposed wall portions of the bore of the anode-forming gun barrel; passing from said barrel to said cathode member through said electrolyte an electric current of a magnitude and for a time period sufficient to produce rifling grooves of proper depths in the exposed wall portions of the bore; and then removing the core and cathode member from the bore to expose the lands of the rifling.

4. In the method of rifling the bore of a gun barrel by anodic dissolution of portions of the bore in the presence of a suitable electrolyte solution, the steps which include temporarily masking against access by the electrolyte only those wall portions of the bore which are adapted to form the lands of the rifling; positioning a cathode member in said bore in spaced relation to the wall thereof; introducing into the bore surrounding said cathode member an electrolyte solution operative for anodic dissolution of the exposed wall portions of the bore; passing an electric current of sufficient magnitude from said barrel to said cathode member through said electrolyte for a period of time sufficient to produce rifling grooves of proper depth in the exposed wall portions of the bore.

5. The method as defined in claim 4, which includes the step of constantly segregating from the electrolyte solution hydrogen which is liberated at the cathode during the electrolysis process.

6. The method as defined in claim 4, which includes the step of cooling the electrolyte solution during the electrolysis.

7. The method as defined in claim 4, which includes the step of circulating the electrolyte solution through the bore of said barrel during said electrolysis.

8. The method as defined in claim 4, which includes the step of disposing said gun barrel in substantially vertical position and circulating the electrolyte solution through the bore during said electrolysis.

9. The method as defined in claim 4, which includes the step of agitating said electrolyte solution by pulsating it back and forth in said bore during the electrolysis.

References Cited in the file of this patent

UNITED STATES PATENTS

| Number | Name | Date |
|---|---|---|
| 908,937 | Bayliss et al. | Jan. 5, 1909 |
| 1,275,028 | Holter | Aug. 6, 1918 |
| 1,329,444 | Thompson | Feb. 3, 1920 |
| 2,172,158 | Brislee et al. | Sept. 5, 1939 |
| 2,359,976 | Duggan | Oct. 10, 1944 |
| 2,401,415 | Duggan | June 4, 1946 |
| 2,590,927 | Brandt et al. | Apr. 1, 1952 |
| 2,620,296 | Wilsdon | Dec. 2, 1952 |
| 2,687,591 | Lamb et al. | Aug. 31, 1954 |
| 2,736,118 | Clarkson et al. | Feb. 28, 1956 |
| 2,741,594 | Bowersett | Apr. 10, 1956 |